United States Patent
Yuzawa

(10) Patent No.: US 6,652,769 B1
(45) Date of Patent: Nov. 25, 2003

(54) REFRIGERANT COMPOSITION AND REFRIGERATING CIRCUIT EMPLOYING THE SAME

(75) Inventor: Jiro Yuzawa, Gunma (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/831,894

(22) PCT Filed: Sep. 28, 2000

(86) PCT No.: PCT/JP00/06697

§ 371 (c)(1),
(2), (4) Date: Aug. 24, 2001

(87) PCT Pub. No.: WO01/23494

PCT Pub. Date: Apr. 5, 2001

(30) Foreign Application Priority Data

Sep. 28, 1999 (JP) ............................. 11-274975

(51) Int. Cl.$^7$ ................................. C09K 5/04
(52) U.S. Cl. ........................................ 252/67
(58) Field of Search ............................ 252/67

(56) References Cited

U.S. PATENT DOCUMENTS

| | | | | |
|---|---|---|---|---|
| 5,444,102 A | * | 8/1995 | Nimitz et al. | 521/131 |
| 6,205,795 B1 | * | 3/2001 | Backman et al. | 62/79 |
| 2002/0001560 A1 | * | 1/2002 | Miller et al. | 423/406 |

FOREIGN PATENT DOCUMENTS

| | | |
|---|---|---|
| JP | 1-139678 | 6/1989 |
| JP | 3-269083 | 11/1991 |
| JP | 8-143859 | 6/1996 |

* cited by examiner

*Primary Examiner*—John Hardee
(74) *Attorney, Agent, or Firm*—Armstrong, Westerman & Hattori, LLP

(57) ABSTRACT

The development of a substitutable refrigerant composition that enables a conventional refrigerating circuit to maintain its performance without changing the circuit configuration has been demanded. An object of the present invention is to provide such a refrigerant composition and a refrigerating circuit using it. A refrigerant composition of the present invention is characterized by comprising R600 (n-butane: $CH_3CH_2CH_2CH_3$), R125 ($CHF_2CF_3$), R508A (R23/R116: 39/61), and R14 (tetrafluoromethane: $CF_4$).

3 Claims, 2 Drawing Sheets

FIG.2

|  | EXAMINATION SPECIFICATION |
|---|---|
| REFRIGERANT | R-600  93g<br>R-125  60g<br>R-508  60g<br>R-14   69g |
| 2.PRESSURE Pd | 1353kPa |
| 19.PRESSURE Ps | 186kPa |
| 1.COMP. BELOW CASE | 65.3°C |
| 2.DISCHARGE PIPE | 82.7°C |
| 19.SUCTION PIPE | 18.6°C |
| 8.HX1 INTERMEDIATE | −9.1°C |
| 13.HX2 INTERMEDIATE | −33.3°C |
| 15.HX3 INTERMEDIATE | −60.1°C |
| 17.EVA-INLET | −95.4°C |
| 18.EVA-OUTLET | −86.0°C |
| INTERIOR 1/2 CENTER air | −89.4°C | under# REFRIGERANT COMPOSITION AND REFRIGERATING CIRCUIT EMPLOYING THE SAME

TECHNICAL FIELD

The present invention relates to refrigerant compositions suitable for ultralow temperature refrigerating machines using non-azeotrope refrigerants, and secure from breaking the ozonosphere.

BACKGROUND ART

Conventionally, in a refrigerating machine using non-azeotrope refrigerants, the lower boiling point refrigerants are condensed in order by evaporating the higher boiling point refrigerants and using the low-temperature fed-back refrigerant. from the final stage evaporator, and thereby the lowest boiling point refrigerant is evaporated at the final stage to obtain an ultralow temperature.

The inventor of the present case has proposed such a refrigerating machine and an example of refrigerant composition in Japanese Patent Publication No. 6-55944.

However, because HCFC is used as this refrigerant, there is a fear of breaking the ozonosphere of the earth.

Therefore, the development of a substitutable refrigerant composition that is secure from breaking the ozonosphere and enables a conventional refrigerating circuit to maintain its performance without changing the circuit configuration has been demanded.

An object of the present invention is to provide such a refrigerant composition and a refrigerating circuit using it. Generally in the field of refrigerant, types of refrigerants are defined by refrigerant numbers according to ASHRAE, so the description is made generally using such refrigerant numbers.

DISCLOSURE OF THE INVENTION

A refrigerant composition of the present invention is characterized by comprising R600 (n-butane: $CH_3CH_2CH_2CH_3$), R125 (pentafluoroethane: $CHF_2CF_3$), R23 (trifluoromethane: $CHF_3$), and R14 (tetrafluoromethane: $CF_4$).

Besides, a refrigerant composition of the present invention is characterized by comprising R600 (n-butane: $CH_3CH_2CH_2CH_3$), R125 (pentafluoroethane: $CHF_2CF_3$), R508A (R23/R116: 39/61), and R14 (tetrafluoromethane: $CF_4$). Besides, the refrigerant composition of the present invention is characterized in that R600 is 28.6 to 42.9 wt. %, R125 is 10.7 to 28.6 wt. %, R508A is 14.3 to 28.6 wt. %, and R14 is 19.6 to 46.4 wt. %.

Besides, a refrigerant composition of the present invention is characterized by comprising R600 (n-butane: $CH_3CH_2CH_2CH_3$), R125 (pentafluoroethane: $CHF_2CF_3$), R508B (R23/R116: 46/54), and R14 (tetrafluoromethane: $CF_4$).

Besides, the refrigerant composition of the present invention is characterized in that R600 is 28.6 to 42.9 wt. %, R125 is 10.7 to 28.6 wt. %, R508B is 14.3 to 28.6 wt. %, and R14 is 19.6 to 46.4 wt. %.

Besides, the present invention is characterized in that any of the above-described non-azeotrope refrigerant compositions is used in a refrigerating circuit as a one-way ultralow-temperature system substantially comprising one set of a condenser, an evaporator, and a compressor, and heat exchangers and gas/liquid separators disposed in multistage.

Besides, the present invention is a refrigerating circuit characterized in that any of the above-described refrigerant compositions is used without any change in a refrigerating circuit which is a one-way ultralow-temperature refrigerating circuit using a conventional CFC mixture refrigerant or HCFC mixture refrigerant and in which alkyl benzene oil (viscosity grade VG22 to VG56) is used as refrigerating machine oil.

The refrigerant compositions of the present application are non-azeotrope refrigerant compositions capable of retrofoot.

BRIEF DESCRIPTION OF THE DRAWINGS

FIG. 2 is a figure for explaining the performance of this embodiment.

BEST MODE FOR CARRYING OUT THE INVENTION

Figure 1:
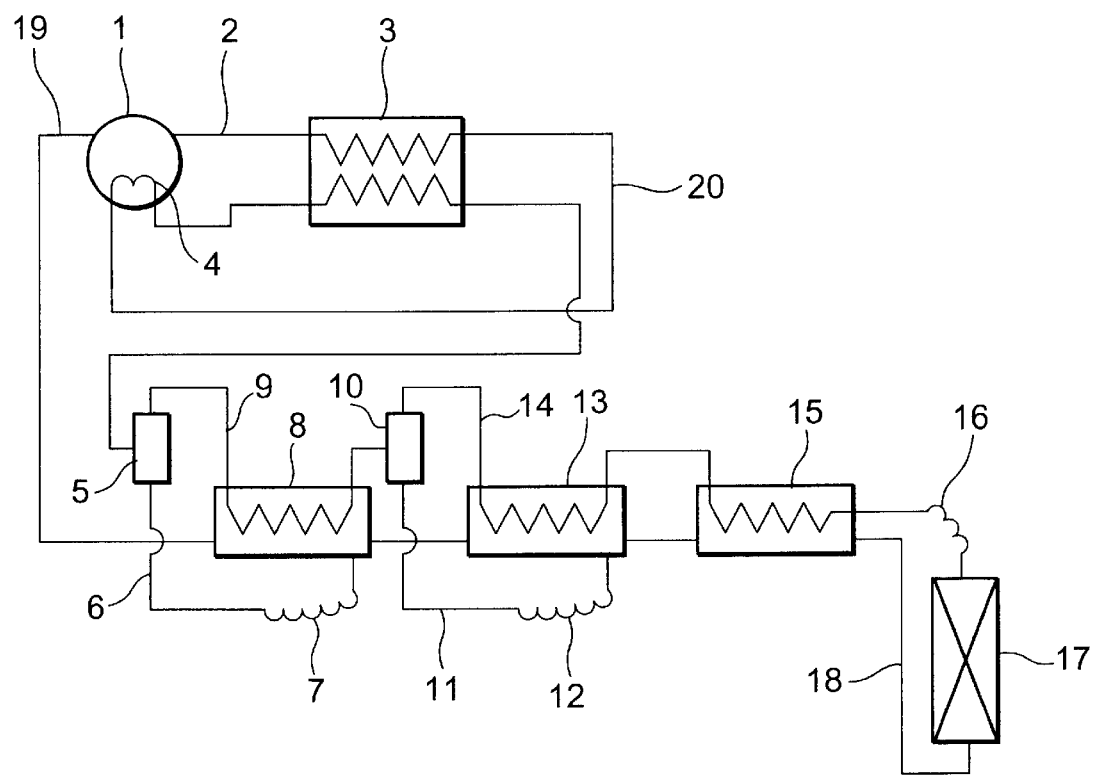
FIG. 1 is a diagram of a refrigerant circuit for explaining the present invention.

Referring to FIG. 1, the first embodiment of the present invention will be described.

FIG. 1 shows a refrigerant circuit using a non-azeotrope refrigerant comprising R600, R125, R508A, and R14.

R508A is a refrigerant in which R23 is mixed with R116 (hexafluoroethane) at a ratio of 39:61.

A discharge side piping (2) of a compressor (1) passes through a condenser (3), extends through a frame pipe (20), and is connected to an oil cooler (4) of the compressor (1).

The piping extending out of the oil cooler (4) again passes through the condenser (3), and is connected to a first gas/liquid separator (5).

A liquid phase piping (6) extending out of this first gas/liquid separator (5) is connected to a first capillary tube (7).

This first capillary tube (7) is connected to a first intermediate heat exchanger (8).

A gas phase piping (9) extending out of the first gas/liquid separator (5) passes through the interior of the first intermediate heat exchanger (8), and is connected to a second gas/liquid separator (10).

A liquid phase piping (11) extending out of the second gas/liquid separator (10) is connected to a second capillary tube (12). The second capillary tube (12) is connected to a second intermediate heat exchanger (13).

A gas phase piping (14) extending out of the second gas/liquid separator (10) passes through the interiors of the second intermediate heat exchanger (13) and a third intermediate heat exchanger (15) in this order, and is connected to a third capillary tube (16).

The third capillary tube (16) is connected to an evaporator (17).

A piping (18) extending out of the evaporator (17) is connected to the third intermediate heat exchanger (15). The third intermediate heat exchanger (15) is connected to the second intermediate heat exchanger (13), and in order, the second intermediate heat exchanger (13) is connected to the first intermediate heat exchanger (8). The first intermediate heat exchanger (8) is connected to a suction side piping (19) of t he compressor (1).

The interior of this refrigerant circuit is filled with a non-azeotrope refrigerant comprising R600, R125, R508A, and R14.

The boiling point s at the atmospheric pressure of R600, R125, R508A, and R14 are −0.5° C., −48.57° C., −85.7° C., and −127.85° C., respectively.

Besides, as for the compositions of the respective refrigerants used in the embodiment, R600 was 33.3 wt. %, R125 was 21.3 wt. %, R508A was 21.3 wt. %, and R14 was 24.4 wt. %.

Next, the operation will be described.

The gaseous mixture refrigerant at a high temperature and a high pressure discharged from the compressor (1) flows into the condenser (3) to radiate heat. The refrigerant then cools lubricating oil in the compressor (1) at the oil cooler (4), and again radiates heat in the condenser (3), where R600 and the most part of R125 of the refrigerant are liquidized. The refrigerant then enters the first gas/liquid separator (5).

In the separator, liquid R600 and R125 are separated from the remaining part of R125 yet gaseous, R508A, and R14. The former group flows into the liquid phase piping (6) while the latter group flows into the gas phase piping (9).

R600 and R125 having flowed into the liquid phase piping (6) are depressurized in the first capillary tube (7), and then flow into the first intermediate heat exchanger (8) to be evaporated there.

Since the fed-back refrigerant from the evaporator (17) is flowing into the first intermediate heat exchanger (8), the temperature of the exchanger is about −9.1° C.

On the other hand, while R125, R508A, and R14 having flowed into the gas phase piping (9) pass through the first intermediate heat exchanger (8), R125 and part of R508A are cooled by R600 and R125 evaporated in the exchanger (8) and the fed-back refrigerant from the evaporator (17). They are condensed and liquidized thereby, and then enter the second gas/liquid separator (10).

In the separator, liquid R125 and R508A are separated from the remaining part of R508A yet gaseous and R14. The former group flows into the liquid phase piping (11) while the latter group flows into the gas phase piping (14).

R125 and R508A having flowed into the liquid phase piping (11) are depressurized in the second capillary tube (12). and then flow into the second intermediate heat exchanger (13) to be evaporated there. Since the fed-back refrigerant from the evaporator (17) is flowing into the second intermediate heat exchanger (13), the temperature of the exchanger is about −33.3° C.

On the other hand, while R508A and R14having flowed into the gas phase piping (14) pass through the second intermediate heat exchanger (13), R508A is cooled by R125 and R508A evaporated in the exchanger (13) and the fed-back refrigerant from the evaporator (17), and thereby condensed and liquidized, and then passes through the third intermediate heat exchanger (15).

Here, the refrigerant coming immediately out of the evaporator (17) is flowing into the third intermediate heat exchanger (15), so the temperature of the exchanger is about −60.1° C.

Thus, R14 flowing in the gas phase piping (14) is also condensed here. These liquidized R508A and R14 are depressurized in the third capillary tube (16), and then flow into the evaporator (17), where they are evaporated to cool the circumference.

At this time, the mean temperature of the evaporator (17) became an ultralow temperature as about −90.7° C. By using this evaporator (17) for cooling, e.g., the interior of a freezer, the interior could be cooled to about −89.4° C.

The refrigerant having come out of the evaporator (17) flows into the intermediate heat exchangers (15), (13), and (8) in turn, and joins with the refrigerants evaporated in them, and then returns to the compressor (1) through the suction piping (19).

Oil of the compressor (1) circulating in the refrigerant circuit is returned to the compressor (1) in a state that it is dissolved in R600.

Besides, R600 serves also to lower the discharge temperature of the compressor (1). The performance of this refrigerating circuit is shown in FIG. 2. The numbers in FIG. 2 show the numbers of the respective parts in FIG. 1. But, Eva-inlet indicates not the evaporator (17) but, in practice, a portion after the third capillary tube (16) and between the evaporator (17) and the capillary tube (16). Besides, the number of Interior ½ center air is not present in FIG. 1 so it is not entered.

The composition of each of these refrigerants is not limited to that of the embodiment. That is, by experiments, it was confirmed that an ultralow temperature of −90° C. or less could be obtained in the evaporator (17) by mixing within the ranges of 28.6 to 42.9 wt. % for R600, 10.7 to 28.6 wt. % for R125, 14.3 to 28.6 wt. % for R508A, and 19.6 to 46.4 wt. % for R14.

In the above mixture refrigerant, even when R23 (trifluoromethane: $CHF_3$: boiling point −82.1° C.) that R116 was removed from R508A is used, the same ultralow temperature can be obtained. Besides, in the above mixture refrigerant, even when R508B (46/54: R23/R116) is used in place of R508A, the same ultralow temperature can be obtained.

POSSIBILITY OF INDUSTRIAL UTILIZATION

According to the present invention, there is no fear that the refrigerant may break the ozonosphere.

What is claimed is:

1. A refrigerant composition comprising R600 (n-butane: $CH_3CH_2CH_2CH_3$), R125 (pentafluoroethane: $CHF_2CF_3$), R508A (R23/R116: 39/61), and R14 (tetrafluoromethane: $CF_4$), wherein R600 is 28.6 to 42.9 wt. %, R125 is 10.7 to 28.6 wt. %, R508A is 14.3 to 28.6 wt. %, and R14 is 19.6 to 46.4 wt. %.

2. A refrigerant composition comprising R600 (n-butane: $CH_3CH_2CH_2CH_3$), R125 (pentafluoroethane: $CHF_2CF_3$), R508B (R23/R116: 46/54), and R14 (tetrafluoromethane: $CF_4$), wherein R600 is 28.6 to 42.9 wt. %, R125 is 10.7 to 28.6 wt. %, R508B is 14.3 to 28.6 wt. %, and R14 is 19.6 to 46.4 wt. %.

3. A refrigerating circuit as a one-way ultralow-temperature system substantially comprising one set of a condenser, an evaporator, and a compressor, and heat exchanges and gas/liquid separators disposed in multistage, characterized in that the a non-azeotrope refrigerant composition according to any of claims 1 or 2 is used.

* * * * *